United States Patent [19]

McBride et al.

[11] Patent Number: 5,318,644
[45] Date of Patent: Jun. 7, 1994

[54] METHOD AND APPARATUS FOR MAKING AN INSULATION ASSEMBLY

[75] Inventors: Merle F. McBride; Clarke Berdan, II, both of Granville; James W. Scott, Newark, all of Ohio

[73] Assignee: Owens-Corning Fiberglas Technology Inc., Summit, Ill.

[21] Appl. No.: 71,140

[22] Filed: Jun. 2, 1993

[51] Int. Cl.$^5$ ............... B29C 65/52; B29C 65/78; B32B 31/10

[52] U.S. Cl. ............... 156/62.2; 156/62.8; 156/202; 156/265; 156/266; 156/302; 156/464; 156/512; 156/519; 156/552; 156/562

[58] Field of Search .......... 156/62.2, 62.6, 62.8, 156/265, 266, 200, 201, 202, 212, 213, 216, 302, 461, 464, 468, 511, 512, 519, 552, 562, 254, 260, 264, 269, 583.5; 53/259, 436, 439, 443, 446, 447, 451, 523, 526, 528, 529, 530, 531, 540, 541, 545, 554; 428/288, 55, 74, 119; 425/371; 65/4.4, 9

[56] References Cited

U.S. PATENT DOCUMENTS

| | | |
|---|---|---|
| 1,336,403 | 4/1920 | Weiss . |
| 1,942,662 | 1/1934 | Rosenblatt . |
| 1,948,395 | 2/1934 | Powell ............................ 65/9 |
| 2,028,253 | 1/1936 | Spafford . |
| 2,045,733 | 6/1936 | Spafford . |
| 2,113,068 | 4/1938 | McLaughlin, Jr. . |
| 2,159,053 | 5/1939 | Saborsky . |
| 2,160,001 | 5/1939 | Saborsky . |
| 2,189,840 | 2/1940 | Simison et al. . |
| 2,206,058 | 7/1940 | Slayter et al. . |
| 2,288,072 | 6/1942 | Collins . |
| 2,307,117 | 1/1943 | Drill . |
| 2,330,941 | 10/1943 | Acuff, Jr. . |
| 2,335,220 | 11/1943 | Edwards . |
| 2,409,066 | 10/1946 | Powell et al. . |
| 2,435,347 | 2/1948 | Gilman . |
| 2,495,636 | 1/1950 | Hoeltzel et al. . |
| 2,500,690 | 3/1950 | Lannan . |
| 2,571,335 | 10/1951 | Browne . |
| 2,579,036 | 12/1951 | Edelman . |
| 2,610,337 | 9/1952 | McMillin et al. . |
| 2,859,489 | 11/1958 | Morrison . |
| 2,913,104 | 11/1959 | Parker . |
| 3,012,923 | 12/1961 | Slayter . |
| 3,039,981 | 6/1962 | Shannon et al. . |
| 3,264,165 | 8/1966 | Stickel . |

(List continued on next page.)

FOREIGN PATENT DOCUMENTS

| | | |
|---|---|---|
| 2501093 | 7/1976 | Fed. Rep. of Germany ...... 156/264 |
| 5508 | 9/1972 | Japan . |
| 21515 | 2/1974 | Japan . |
| 14979 | 2/1976 | Japan . |
| 73708 | 6/1978 | Japan . |
| 143156 | 11/1978 | Japan . |
| 84657 | 6/1979 | Japan . |
| 42730 | 12/1979 | Japan . |
| 51382 | 4/1980 | Japan . |
| 23583 | 5/1982 | Japan . |
| WO87/05861 | 10/1987 | PCT Int'l Appl. . |
| 311881 | 8/1971 | U.S.S.R. . |
| 336318 | 4/1972 | U.S.S.R. . |
| 399496 | 2/1974 | U.S.S.R. . |
| 541827 | 1/1977 | U.S.S.R. . |
| 785279 | 12/1980 | U.S.S.R. . |
| 1143733 | 3/1985 | U.S.S.R. . |
| 1321852 | 7/1973 | United Kingdom . |

OTHER PUBLICATIONS

Performance Report #1-88, Performance Seal, Inc., Dallas, Tex.

(List continued on next page.)

*Primary Examiner*—Michael W. Ball
*Assistant Examiner*—Steven D. Maki
*Attorney, Agent, or Firm*—Ted C. Gillespie; Charles H. Ellerbrock

[57] ABSTRACT

A method and apparatus for making an insulation assembly is disclosed. A plurality of mineral fibers are moved along a conveyor system after having been cut to desired sizes. A section having a major surface is moved in a direction generally normal to that of following sections, while maintaining the major surface in a plane parallel to the plane of the major surfaces of the following sections. A plurality of the individual sections move through an encapsulation module where they are assembled and covered to form the insulation assembly.

12 Claims, 6 Drawing Sheets

U.S. PATENT DOCUMENTS

| | | |
|---|---|---|
| 3,337,669 | 8/1967 | Shannon et al. |
| 3,345,241 | 10/1967 | Shannon |
| 3,367,818 | 2/1968 | Voelker |
| 3,493,452 | 2/1970 | Cole |
| 3,513,628 | 5/1970 | Lee et al. |
| 3,729,879 | 5/1973 | Franklin |
| 3,736,215 | 5/1973 | Felder et al. |
| 3,819,468 | 6/1974 | Sauder et al. |
| 3,832,815 | 9/1974 | Balaz et al. |
| 3,952,124 | 4/1976 | Mesek |
| 3,955,031 | 5/1976 | Jones et al. |
| 4,128,678 | 12/1978 | Metcalfe et al. |
| 4,172,345 | 10/1979 | Alderman |
| 4,182,237 | 1/1980 | O'Brien |
| 4,238,257 | 12/1980 | Remi et al. |
| 4,296,164 | 10/1981 | Bemis et al. |
| 4,331,730 | 5/1982 | Sorenson |
| 4,395,455 | 7/1983 | Frankosky |
| 4,399,175 | 8/1983 | Kummermehr et al. |
| 4,457,500 | 7/1984 | Drachenberg et al. |
| 4,552,793 | 11/1985 | Cameron et al. |
| 4,556,593 | 12/1985 | Hughes |
| 4,569,174 | 8/1986 | Bossany |
| 4,590,714 | 5/1986 | Walker |
| 4,637,947 | 1/1987 | Maekawa |
| 4,696,138 | 9/1987 | Bullock |
| 4,705,717 | 11/1987 | Cain et al. |
| 4,707,960 | 11/1987 | Bullock |
| 4,729,210 | 3/1988 | Galliano |
| 4,751,134 | 6/1988 | Chenoweth et al. |
| 4,756,860 | 7/1988 | Hooper et al. |
| 4,805,383 | 2/1989 | Allwein |
| 4,927,705 | 5/1990 | Syme et al. |
| 4,961,810 | 10/1990 | Svensson et al. ............ 156/295 |
| 5,236,754 | 8/1993 | McBride et al. ............ 428/74 |

OTHER PUBLICATIONS

"Membranes Improve Insulation Efficiency", by Christopher A. Bullock, Third Annual Symposium on Improving Building Energy Efficiency in Hot And Humit Climates, Nov. 18–19, 1986, Arlington, Tex.

"Attic Seal–'Convection Barrier' for Attic Insulation", Energy Design Update, Jun. 1988, pp. 10–13.

"Attic Seal Protects the Thermal Efficiency of Fiber Insulation", brochure, pp. 1–4.

"Fiberglas Building Insulation In Residential Construction" Owens–Corning Fiberglas Corp. brochure, Fiberglas Standards A8.2.1.

"Criterion for the appearance of natural convection in an anisotropic porous layer" by J. F. Epherre, International Chemical Engineering (vol. 17, No. 4) Oct. 1977, pp. 615–616.

"Natural Convection in Enclosed Porous Media With Rectangular Boundaries" by B. K. C. Chan et al., Journal of Heat Transfer, Feb. 1970, pp. 21–27.

"Thermal Performance of the Exterior Envelopes of Buildings II", Proceedings of the ASHRAE/DOE Conference, Dec. 6–9, 1982.

"Thermal Performance of Residential Attic Insulation", by Kenneth E. Wilkes et al., Energy and Buildings 5 (1983) pp. 263–277.

"Thermao–Brite® Radiant Barrier", PARSEC Product Bulletin 200–1, Jun. 1984, PARSEC, Inc.

"Hydrothermal Convection in Saturated Porous Media", by M. A. Combarnous et al., Groupe d'Etude I.F.P.–I.M.F. sur les Milieux Pareux, Toulouse, France 1971, pp. 231–307.

"Natural Convection in Vertical Permeable Space", by Claes G. Bankvall, Warme– und Stoffubertragung 7 (1974) No. 1.

"The Properties And Processing Of 'TYVEK' Spundbonded Olefin", DuPont Technical Information Manual for TYVEK, 1978.

"Stop energy–robbing air infiltration in your buildings with barrier sheeting of TYVEK", DuPont brochure.

"Lessons From A Mock Attic", by Nancy Armistead, Popular Science, Dec. 1992.

"Thermal Performance of One Loose–Fill Fiberglass Attic Insulation", by Kenneth E. Wilkes, Insulation Materials; Testing and Applications, 2nd vol., ASTM STP 1116.

"Evaluation of Attic Seal Products Applied To Loose–Fill Fiberglass Insulation In A Simulated Residential Attic–Phases I and II", by K. E. Wilkes et al., Oak Ridge National Laboratory, Letter Report ORNL–/M–1644.

"R–19 Insulation Only", picture of product cover, Nov. 18, 1982, Owens–Corning Fiberglas Corp.

"Directions for Applying Building Insulation", brochure, Owens–Corning Fiberglas Corp.

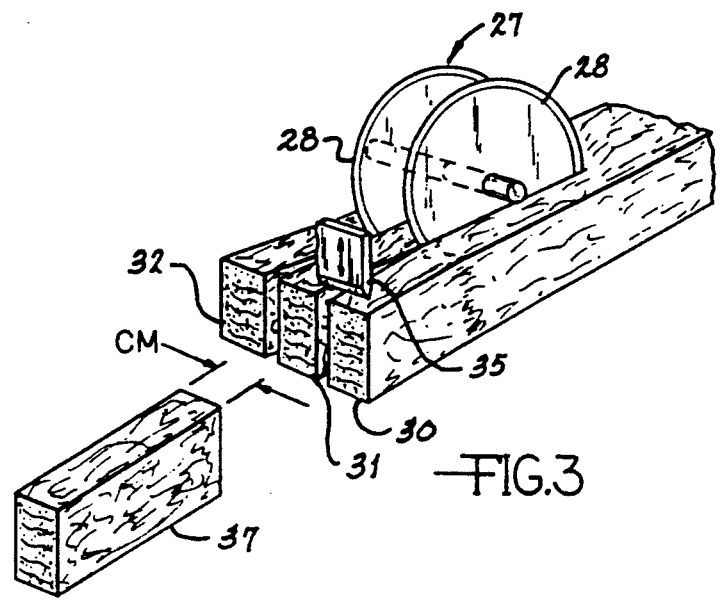
FIG.3
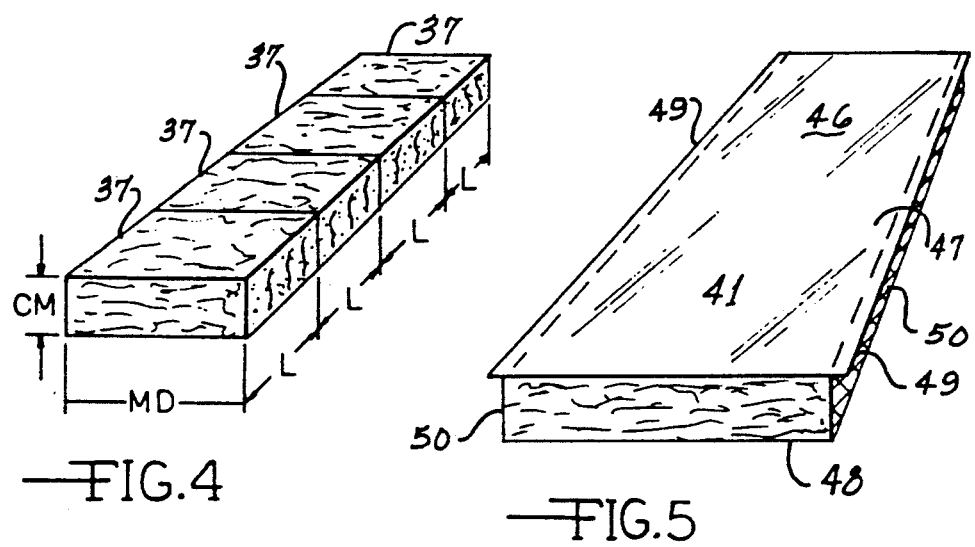
FIG.4
FIG.5

METHOD AND APPARATUS FOR MAKING AN INSULATION ASSEMBLY

BACKGROUND OF THE INVENTION

The present invention relates to a method and apparatus for making an insulation assembly and more particularly relates to a method and apparatus for making a reoriented assembly which is used to insulate buildings including insulating floors, ceilings and walls of such buildings.

It is well known in the art to insulate buildings using various types of insulating materials including mineral fibers, such as fibrous glass wool. While the present invention may be used to make an insulation assembly which includes a mineral fiber binder, the present method and apparatus is particularly directed to a so-called binderless mineral fiber product, used in an overall insulation assembly. The mineral fibers used can be, for example, mineral wool or fibrous glass wool.

SUMMARY OF THE INVENTION

The present invention relates to a method and apparatus for making a reoriented insulation assembly. Such a reoriented insulation assembly provides an improved building insulation product which can be rapidly and effectively installed between, for example, wall studs, ceiling trusses, and floor joists of buildings.

The insulation assembly is formed from mineral fibers such as rock wool or fibrous glass wool. Each insulation assembly includes a plurality of sections constructed of, for example, a low density fibrous glass wool. Each of the sections has a machine direction, a cross direction and a loft direction. The machine direction is essentially the direction in which the section is formed in the fiber forming apparatus as it is placed on the forming conveyor. The loft direction is the depth of the material as it lies on the conveyor, while the cross machine direction is that direction which is perpendicular to the machine direction on the plane of the conveyor. Initially as the fibrous pack travels along the forming conveyor, the loft direction is vertical and the cross machine direction is horizontal.

According to the present invention, a mineral fibrous pack, such as a fibrous glass wool pack, is formed on a forming conveyor. The formed glass wool pack is severed or split parallel to the machine direction to form strips of desired strip widths. As used in the present specification the words cut, chop, slice or split all refer to the generic act of severing. A strip is then moved along a predetermined path where it is cut or chopped parallel to the cross machine direction to a desired strip length to form a section of the insulation assembly. The chopped sections are then serially moved along a predetermined path where they are then moved normal to the predetermined path through an encapsulation module where an exterior layer or layers are applied which form the exterior cover. The dropping action and the relative position of the encapsulation module reorients the individual sections to form the desired insulation assembly.

The reorienting of the sections relative to each other orients the final product such that the expansion of the product, which is most prominent in the original loft direction, is controlled. The reoriented insulation assembly exhibits rigidity which holds the reoriented insulation assembly in a correct position. Secondly, the fiber expansion, which is in the original loft direction, does not urge the main faces of the final package outwardly in a protruding fashion. It is the primary object of the present invention to provide an improved method and apparatus for making a desired reoriented insulation assembly.

DESCRIPTION OF THE DRAWINGS

FIG. 3 is a perspective view, partial diagrammatic, showing the pack of mineral fibers being slit parallel to the machine direction to form strips and also showing the chopping of a strip.

FIG. 4 is a perspective view of the mineral fiber sections which have been reoriented into their final desired orientation.

FIG. 5 is a perspective view of a reoriented insulation assembly, which is constructed according to the method and apparatus of the present invention.

DESCRIPTION OF THE PREFERRED EMBODIMENTS

Figure 1:
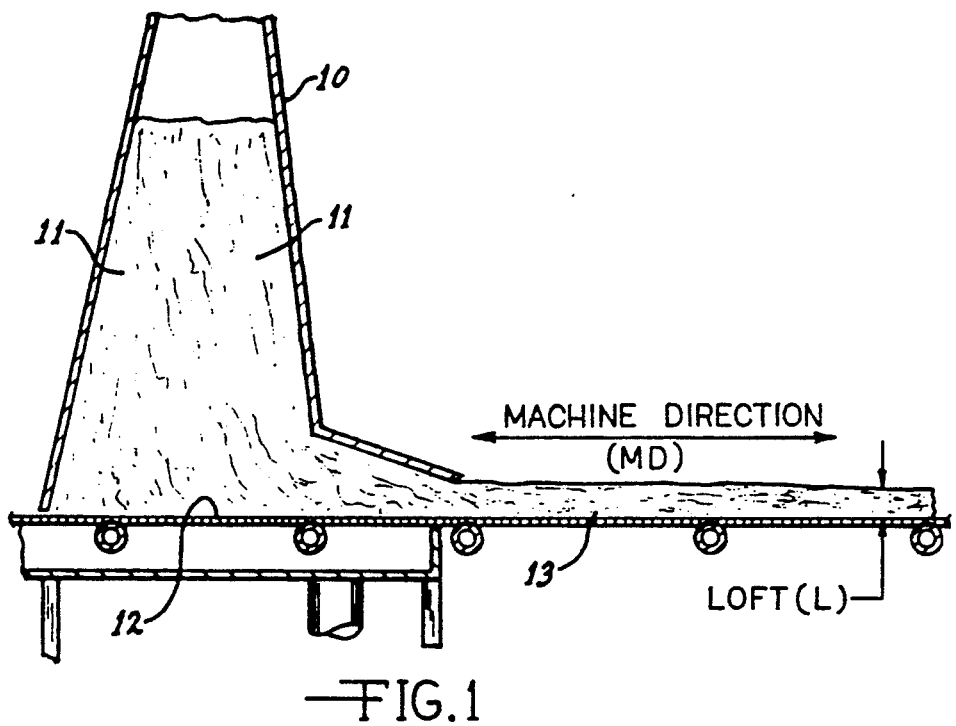
FIG. 1 is a fragmentary vertical cross-sectional view showing mineral fibers, such as glass fibers, being deposited through a forming hood onto a conveyor and illustrating the machine direction and also the loft direction of the fibrous glass pack as it is being formed.

Referring to FIG. 1, a mineral fiber forming hood 10 is shown. Mineral fibers 11, such a rock wool fibers or glass fibers, move downwardly onto a moving conveyor 12 to form a mineral fiber pack 13.

Figure 2:
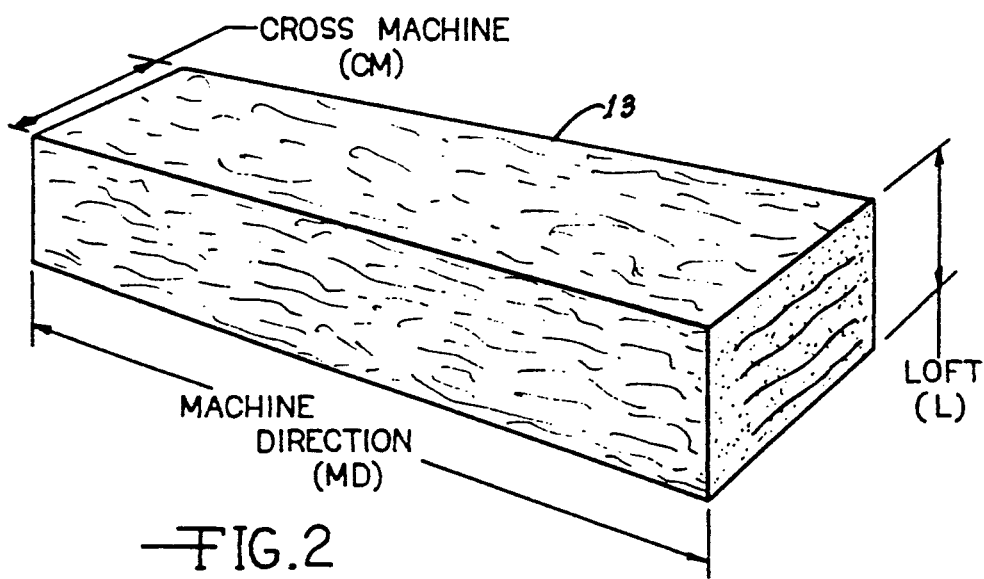
FIG. 2 is a perspective view of the pack after it has been formed and illustrating the cross machine direction, the machine direction and the loft direction.

FIG. 2 illustrates a portion of the pack 13. For the purpose of this patent specification and claims, the thickness of the originally formed fibrous pack 13 is termed the loft direction (L) while the longitudinal direction of the conveyor is termed the machine direction (MD). The width of the fibrous pack 13 is termed the cross machine direction (CM).

If the fibrous pack 13 is a fibrous glass pack, the glass fibers preferably have a mean length weighted fiber diameter less than 0.00034 inch (8.64 E-6 meters). The glass fibers preferably have a mean length weighted fiber diameter between 0.00010 inch (2.54 E-6 meters) and 0.00024 inch (6.10 E-6 meters).

The present invention may be used in the production of insulation assemblies having mineral fibers which include a binder or which are binderless. The present method and apparatus is particularly suitable in producing an insulation assembly using a "binderless" fibrous glass wool. The term "binderless" means the absence of binder materials or the presence of only small amounts of binder materials, amounting to no more than one percent (1%) by weight. The addition of suppressants, e.g. oils, for dust control or other purposes is not considered a binder.

Figure 7:
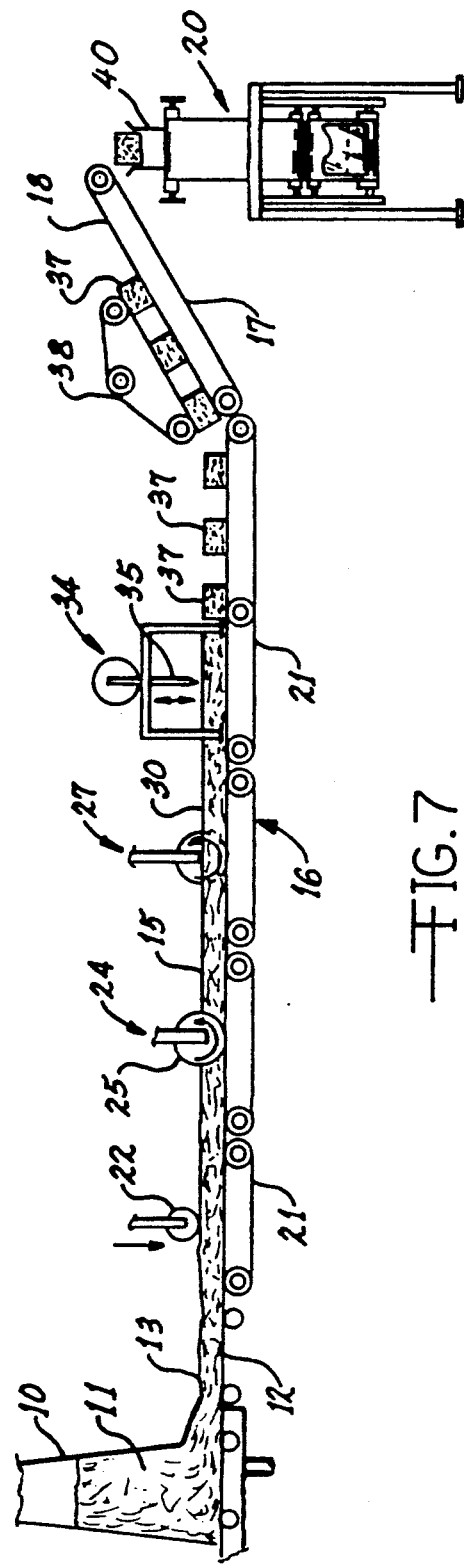
FIG. 7 is a diagrammatic elevational view showing the method and apparatus for constructing a reoriented insulation assembly, according to the present invention.

Referring to FIG. 7, after the fibrous pack 13 is initially formed at the forming hood 10, the fibrous pack 13 is moved along a generally horizontal predetermined path 15. The predetermined path 15 is defined by the overall horizontal conveyor system 16 of which the moving conveyor 12 is one component. An inclined conveyor 17 defines an inclined path 18 relative to the generally horizontal predetermined path 15. An encapsulation module 20 is located at the discharge end of the inclined conveyor 17.

Referring to FIGS. 7 and 3, as the fibrous pack 13 leaves the area of the forming hood 10, a plurality of extension conveyors 21 which are a part of the conveyor system 16 receive the pack as it moves to the right as shown in FIG. 7. At a first station, a press roller 22 compresses the fibrous pack 13 to a desired loft thickness. At a second station, an edge trim assembly 24 having opposed edge saws 25 trims the edges of the fibrous pack 13 to a predetermined cross machine width.

At a third station, a slitting assembly 27 including a plurality of slitting blades 28 slits or severs the fibrous pack 13 parallel to the machine direction into strips 30, 31 and 32 each having a predetermined strip width. Each of the strips 30, 31 or 32 may have a different predetermined strip width depending on the design of the desired final insulation assembly.

The predetermined strip width is the desired overcut thickness. The thickness referred to is the cross machine dimension as indicated in FIG. 3. This predetermined thickness in the cross machine dimension is indicated in FIG. 3. This predetermined thickness in the cross machine direction will normally be one to three times the finished product thickness. Preferably the predetermined thickness is in the range of 1.5 to 2.5 times the finished thickness for low "R" values per inch, such as R11 or R19, and in the range of 1.0 to 2.0 for the high "R" values per inch, such as R13 or R21.

It has been found that a preferable range for the density of fibrous glass sections which are traveling along the conveyor system 16 falls between 0.05 pounds per cubic foot (0.8 kg/M$^3$). and 0.5 pounds per cubic foot (8.01 kg.M$^3$).

The density of the fibrous glass in the final product form is normally less than 2.0 pounds per cubic foot (32.03 kg/M$^3$). More specifically, the final product density is preferably less than 1.0 pounds per cubic foot (16.02 kg.M$^3$).

Still referring to FIG. 3, after the strip 30 has been cut or split by the slitting assembly 27, it continues along the conveyor system 16.

A chopper assembly 34 having, for example, a vertically reciprocating chopping blade 35 cuts or chops the strip 30 into fibrous glass sections 37. The cut or chop is parallel to the cross machine direction. Still referring to FIG. 7, the serially spaced sections 37 continue to move along the extension conveyors 21 and are directed upwardly along the inclined conveyor 17. A supplemental conveyor 38 may be used to engage and urge the serial sections 37 along the inclined conveyor 17.

As shown in FIG. 7, when a section 37 reaches the top of the inclined conveyor 17, it is moved in a direction generally normal to the predetermined path 15 of the main horizontal portion of the conveyor system 16. In the present embodiment the vertical movement is a downward dropping of the serial sections 37 into an accumulation chamber 40. The present invention is not limited to a downward movement as opposed to an upward movement of the sections 37. Furthermore, while the movement of the individual section is generally normal to the path of the following sections, the movement in other embodiments is sidewise or horizontal rather than vertical.

In the present embodiment, the dropping action or vertical movement moves the section 37 along a generally normal path relative to the following serial sections 37 as they travel along the conveyor system 16. During the movement the plane of the main surface of the individual dropped section 37 is generally parallel to the plane of the major surfaces of the following sections 37. As used in the present specification and claims the term "major surface" means the upper or lower surface in the plane of the conveyor path. In the present embodiment, referring to FIGS. 3 and 7, the "major surface" is the top or bottom surface of the following serial sections 37 and not the largest surface. The side walls of the accumulation chamber 40 slow the speed of the dropped sections 37 and place them into the stacked relationship diagrammatically indicated in FIG. 6. The accumulation chamber 40 is located at the upper end of the encapsulation module 20. The stacked sections 37 move vertically downwardly through the encapsulation module 20 where they are provided with an exterior cover 41. A cutting assembly 43 having a reciprocating cutting blade 44 is positioned at the lower end of the encapsulation module 20. The cutting blade 44 cuts the units into individual insulation assemblies 46.

The stacking reorientation of the sections 37 does not have to be accomplished by the vertical dropping described above. In other embodiments, the serially moving sections 37 may be individually rotated ninety degrees and stacked while still moving along a horizontal path. In those embodiments, a horizontal wrapping module is utilized to apply the exterior cover 41 to a predetermined number of stacked sections 37 to form the completed insulation assembly 46.

Figure 6:
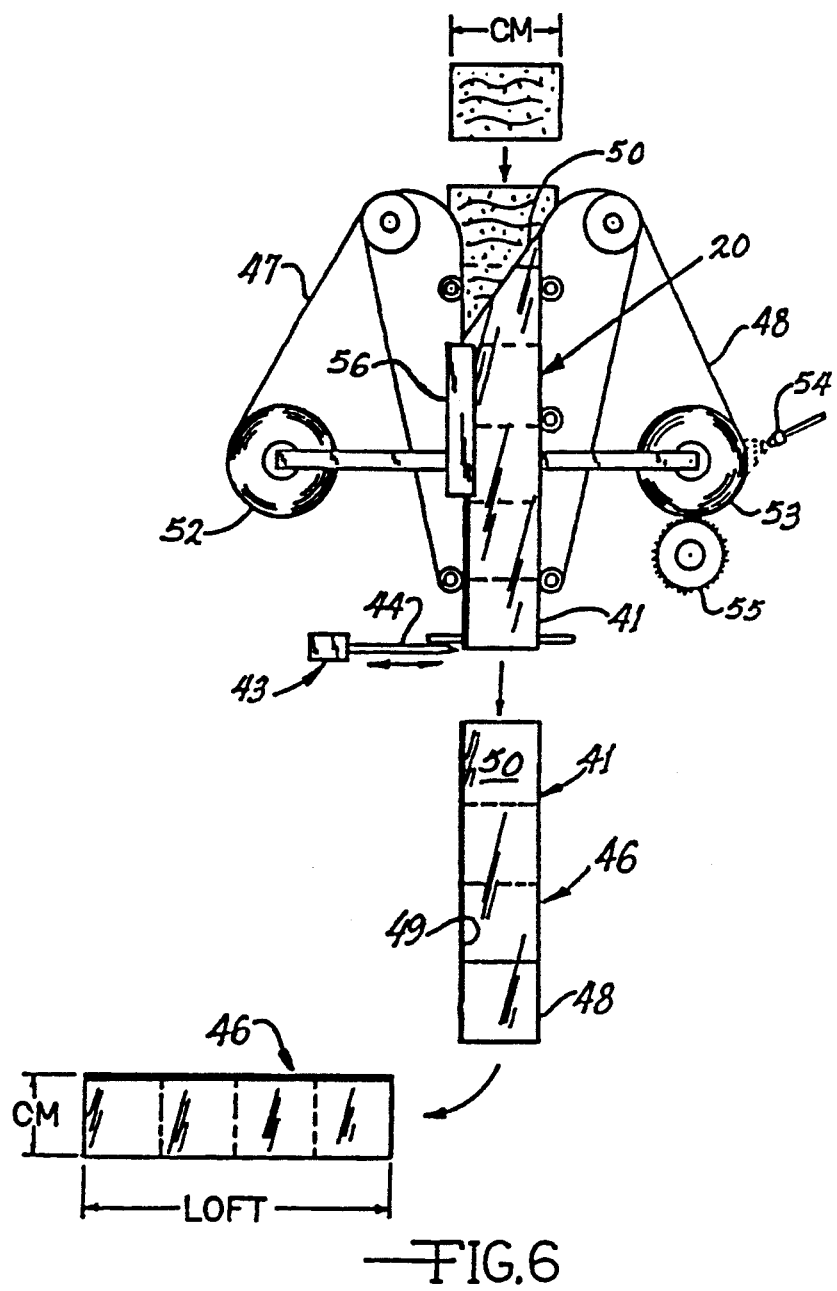
FIG. 6 is a diagrammatic view showing the individual sections moving through an encapsulation module, according to the present invention, and showing the insulation assembly being discharged from the bottom.

Referring to FIGS. 4 and 5, the insulation assembly 46 includes, for example, four fibrous glass sections 37 which abut one another and, if desired, are adhered or otherwise fastened to one another. In the reoriented insulation assembly 46, with the section alignment shown in FIG. 4, the width of the insulation assembly 46 is in the machine direction; the length of the insulation assembly 46 is in the loft direction and the depth or thickness of the insulation assembly 46 is in the cross machine direction. This final reoriented position is indicated in FIG. 6.

The exterior cover 41 of the insulation assembly 46, in the present embodiment, is a multiple component cover. The top layer 47 and bottom layer 48 are each comprised of a 0.4 mil high density-high molecular weight (HDHMW) polyethylene layer. In the present embodiment, the polyethylene layer 47 includes side flanges 49 which extend outwardly from the side edges. The side flanges 49 may be used, for example, to staple the insulation assemblies 46 to adjoining studs in a building stud wall system.

In the present embodiment, the exterior cover 41 of the insulation assembly 46 includes side layers 50 constructed of a non-woven material layer.

The encapsulation module 20 can apply up to four different facing materials to the stacked sections 37 at one time. While the material layers 47, 48 and 50 of the exterior cover 41 are disclosed above as polyethylene major surfaces and non-woven mat side surfaces, other material layers can be used. These include kraft paper, several different types of polyethylene, Mylar and numerous other materials. Each material layer, which is a component of the exterior cover 41, is sealed to the adjoining material. This is done, for example, by heat sealing or by adhesives. In some cases, it is also desirable to perforate one or more of the material layers.

The accumulation chamber 40 and the encapsulation module 20 set the production density by precompressing the sections 37 in the thickness, width and length directions. Referring to FIG. 6, the top polyethylene layer 47 is shown being pulled from a supply roll 52 while the bottom polyethylene layer 48 is being removed from a supply roll 53. The layers 47 and 48 together with the side layers 50 are applied to the stacked sections 37 and joined together as they move through the encapsulation module 20. In the embodiment shown in FIG. 6, an adhesive nozzle 54 applies adhesive to the bottom polyethylene layer 48 on its inner surface. This helps join the stacked sections 37 as they move through the encapsulation unit 20. Also, in the present embodiment, a perforating roll 55 perforates the bottom polyethylene layer 48 prior to its application. A flange heat seal unit 56 heat seals the cover components together along with the side flanges 49. The side flanges 49, while only being shown adjacent the top surface of the present embodiment, may also be placed adjacent the bottom surface of the insulation assembly 46.

Figure 8:
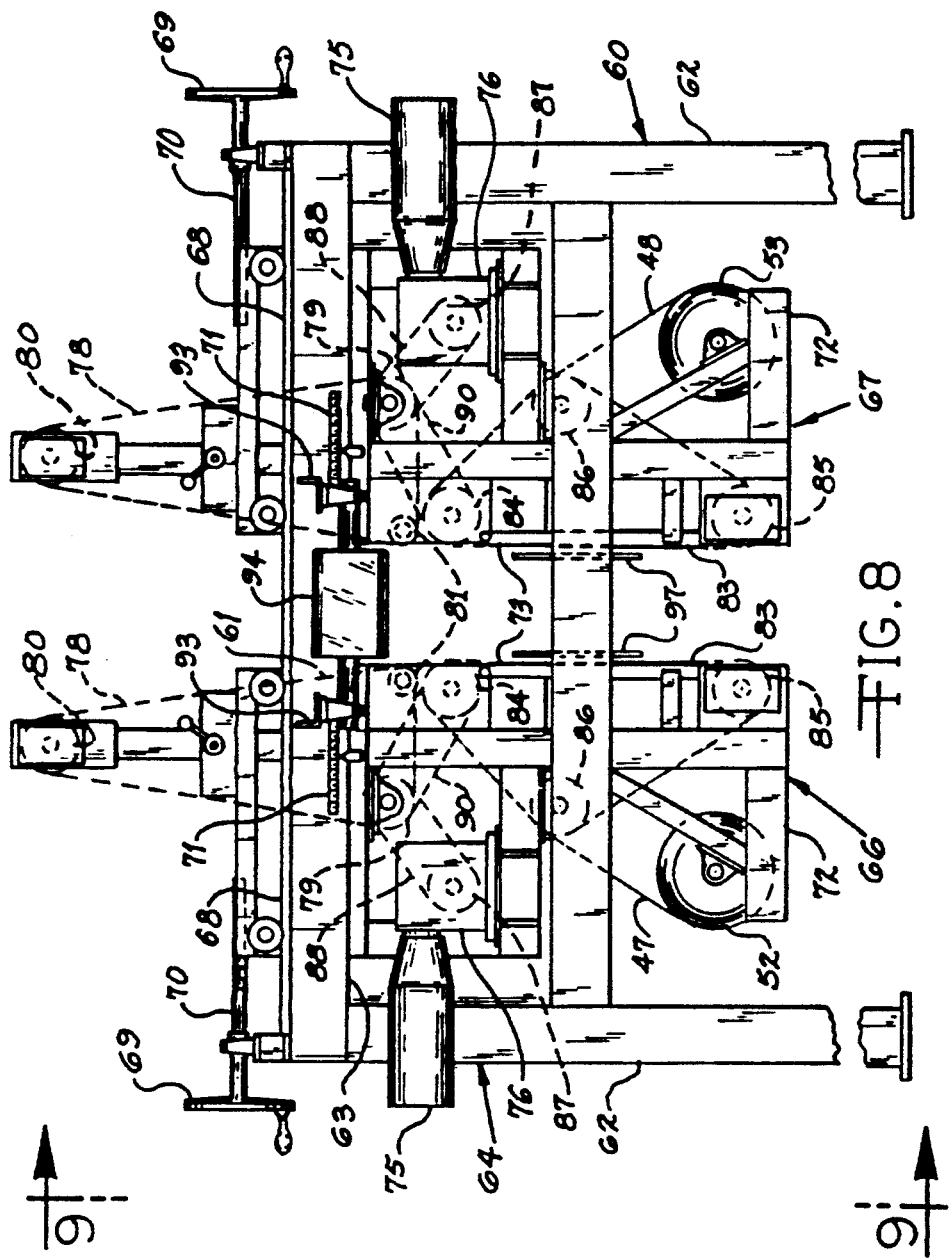
FIG. 8 is an elevational view of another embodiment of an encapsulation module, according to the present invention.
Figure 9:
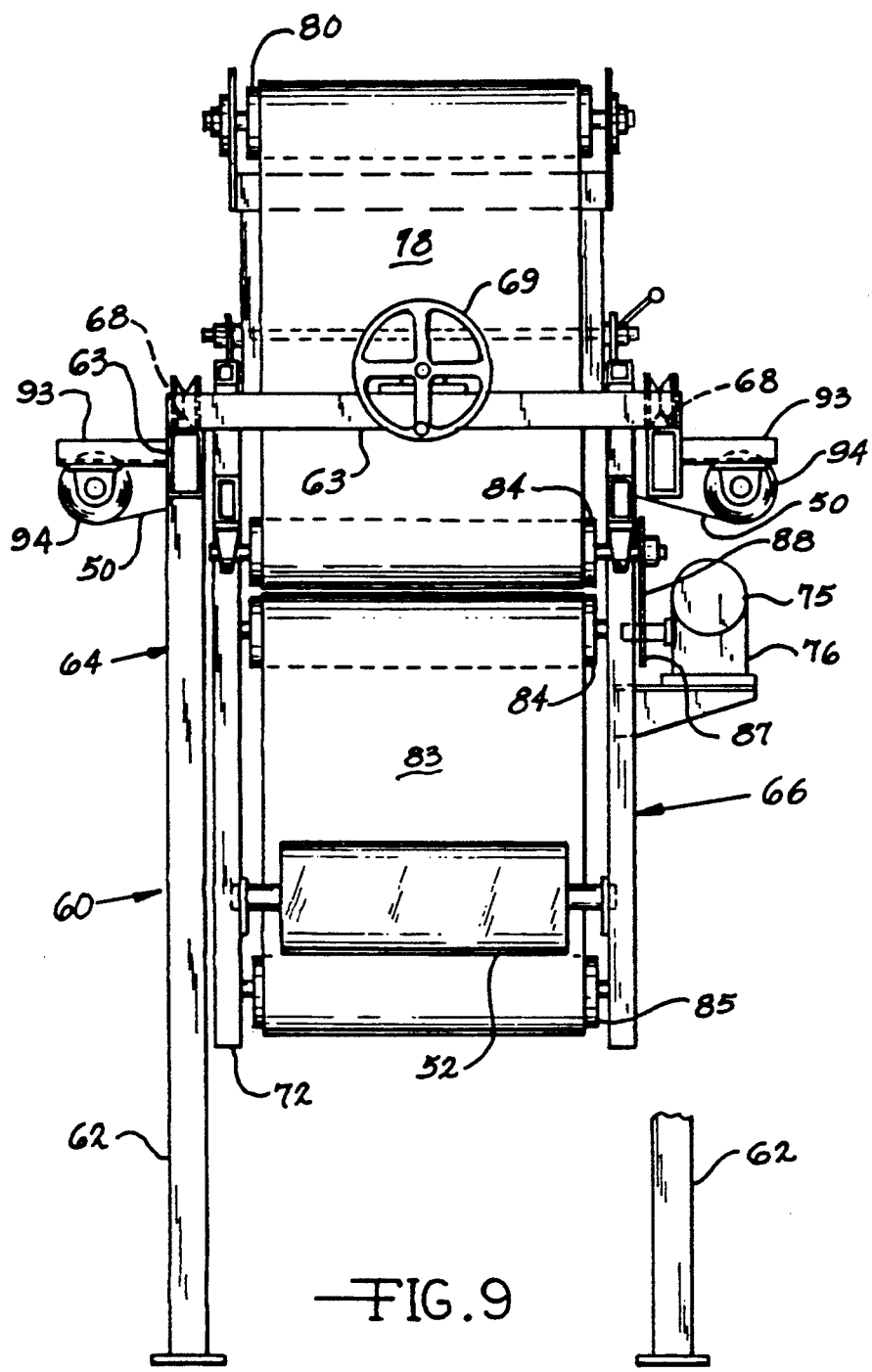
FIG. 9 is an end view of the encapsulation module taken along the line 9—9 of FIG. 8.

Referring to FIGS. 8 and 9, another embodiment of an encapsulation module, indicated by the reference number 60, is shown. The encapsulation unit 60 receives the stacked mineral fibrous sections 37 from the accumulator chamber in a manner similar to the encapsulation module 20 shown in FIG. 6. As the sections 37 move downwardly through the throat 61 of the encapsulation module 60, the sections are compressed to their desired size and density. During the downward movement the exterior cover 41 consisting of top and bottom layers 47 and 48 together with the side layers 50 are applied to the four sides of the stacked sections 37 to form the overall insulation assembly 46.

The encapsulation module 60 includes four vertical frame legs 62 and horizontal frame members 63. The vertical frame legs 62 and the horizontal frame members 63 are connected together to form an overall stationary frame 64. A movable carriage 66 is mounted on one side of the frame 64 and an opposed movable carriage 67 is mounted on the other side of the frame 64. Referring to FIG. 8, the carriages 66 and 67 are mounted for movement on frame tracks 68. The carriages 66 and 67 are moved along the tracks 68 by rotating hand wheels 69 which are connected to the carriages 66 and 67 toward and away from one another. The location of each of the carriages 66 and 67 are apparent from indicator units 71.

Each of the movable carriages 66 and 67 includes a subframe 72 which mounts vertical backing plates 73. The opposed backing plates 73 define the desired width of the stacked sections 37 as they move downwardly through the throat 61.

Each of the movable carriages 66 and 67 mount a variable speed motor 75 which is connected to a gear box 76. At the upper ends of the movable carriages 66 and 67 a continuous belt 78 extends around three triangularly spaced belt rollers 79, 80 and 81.

Similarly, a lower continuous belt 83, which passes over the backing plates 73, extends around lower belt rollers 84, 85 and 86.

The lower continuous belts 83 also serve as guides and support for the cover layers 47 and 48 as they are being pulled from the supply rolls 52 and 53. Output drive pulleys 87 are connected by drive belts 88 to the upper belt rollers 79 to drive the upper continuous belt 78. A belt 90 mounted on the same shaft as the upper belt roller 79 is interconnected with the shaft of the lower belt roller 84, wherein the drive motors 75 effectively drive both the upper and lower continuous belts 78 and 83. In other embodiments (not shown) the encapsulation module 20 includes two motors on each movable carriage. The motors are connected independently to either the top continuous belt or the lower continuous belt.

Referring to FIGS. 8 and 9, brackets 93 mount supply rolls 94 which supply the side layers 50.

In the present embodiment, the top layer 47, the bottom layer 48 and the two side layers 50 are placed on the stacked sections 37 in the encapsulation module 60. The layers 47, 48 and 50 are joined together by heat sealing units 97, as shown in FIG. 8.

In the same manner as the encapsulation module 20, after the layered sections 37 are discharged from the bottom of the throat 61, the cutting assembly 43 cuts the insulation assembly 46 to its desired length.

Numerous revisions can be made to the specific method steps and apparatus disclosed above, without departing from the scope of the following claims.

We claim:

1. A method of making an insulation assembly, including the steps of forming a pack of mineral fibers, the pack having a machine direction, a cross machine direction and a loft direction, cutting said pack parallel to said machine direction into strips having a predetermined strip width, moving said strips along a predetermined path, cutting said strips parallel to said cross machine direction to a predetermined section length to form a plurality of mineral fiber sections, each of said plurality of mineral fiber sections having a major surface, moving said plurality of mineral fiber sections serially along the predetermined path, said plurality of mineral fiber sections including a plurality of individual sections and a plurality of following sections, moving said individual sections between guide means in a direction normal to the predetermined path while maintaining the major surfaces of said individual sections in a plane generally parallel to the plane of the major surfaces of said plurality of following sections moving along said predetermined path, assembling the individual sections, and fastening a cover to said individual sections to join said individual sections and form the insulation assembly while moving said individual sections in said normal direction.

2. A method, according to claim 1, including the step of severing said insulation assembly to a desired insulation assembly length.

3. A method, according to claim 1, wherein said mineral fibers are fibrous glass.

4. A method, according to claim 1, wherein said major surface is an upper surface and wherein the individual sections are moved vertically downward when they are moved in said normal direction.

5. A method, according to claim 1, wherein said individual sections are fibrous glass sections and wherein said fibrous glass sections are compressed to a final product density of less than 2.0 pounds per cubic foot (32.03 kg/M³).

6. Apparatus for making an insulation assembly having a plurality of assembled mineral fiber sections and an exterior cover, said apparatus comprising means for forming a pack of mineral fibers, means for cutting the pack into a plurality of mineral fiber sections, conveyor means for moving said plurality of mineral fiber sections along a predetermined path, said plurality of mineral fiber sections each having a major surface, said plurality of mineral fiber sections including a plurality of individual sections and a plurality of following sections, and an encapsulation module defining an encapsulation module section path generally normal to said predetermined path, said conveyor means delivering said individual sections to said encapsulation module, said encapsulation module including means for maintaining the major surface of said individual sections in a plane generally parallel to the major surface of said plurality of following sections moving along said predetermined path while said individual sections move along said encapsulation module section path, means for applying adhesive to a cover and means for applying the cover to said plurality of individual sections while said individual sections move along said encapsulation module section path, whereby said individual sections are joined and covered by said cover to form said insulation assembly, said encapsulation module including a frame, opposed carriages movably mounted on said frame, at least one continuous belt mounted on each of said carriages, and drive means for moving said belts, said continuous belts on said opposed carriages being positioned adjacent said encapsulation module section path.

7. Apparatus, according to claim 6, including an accumulation chamber above and in communication with said encapsulation module.

8. Apparatus, according to claim 6 wherein said means for applying the cover includes a plurality of supply rolls mounted adjacent said frame for supplying covers to said individual sections and seal means for joining said covers together to form said exterior cover.

9. Apparatus, according to claim 6, including severing means adjacent the bottom of said section path for cutting said insulation assembly to a desired length.

10. Apparatus for making an insulation assembly having a plurality of assembled mineral fiber sections from a pack of mineral fibers, and having an exterior cover, comprising, in combination, a conveyor for receiving said pack of mineral fibers, said conveyor defining a predetermined path, first severing means for cutting said pack in a machine direction parallel to said predetermined path into at least one mineral fiber strip, second severing means for cutting said at least one mineral fiber strip in a cross machine direction perpendicular to said predetermined path to form a plurality of mineral fiber sections, each of said plurality of mineral fiber sections having a major surface, each of said plurality of mineral fiber sections including a plurality of individual sections and a plurality of following sections, an encapsulation module positioned adjacent said conveyor and defining a section path generally normal to said predetermined path, said encapsulation module including means for maintaining the major surfaces of said individual sections in a plane generally parallel to the plane of the major surfaces of said plurality of following sections moving along said predetermined path, an accumulation chamber positioned above said encapsulation module for receiving said individual sections from said conveyor and delivering said sections to said encapsulation module, said encapsulation module including a frame, an opposed pair of carriages mounted for horizontal movement on said frame on opposite sides of said section path, each of said carriages mounting a continuous belt having a surface adjacent said section path, drive means for said belts, means for applying an adhesive to a cover and cover applying means adjacent said section path for applying said cover to said individual sections, whereby the individual sections are joined and covered by said cover to form said insulation assembly.

11. Apparatus, according to claim 10, wherein said cover applying means includes means for applying said covers to said individual sections and seal means for joining said covers together to form said exterior cover.

12. Apparatus, according to claim 10, including third severing means adjacent said section path for cutting said insulation assembly to a desired length.

* * * * *